United States Patent [19]

Wang

[11] Patent Number: 5,477,042
[45] Date of Patent: Dec. 19, 1995

[54] 2-D BAR CODE SCANNER/DECODER HAVING A REDUNDANCY CANCELLER

[75] Inventor: Ynjiun P. Wang, Stony Brook, N.Y.

[73] Assignee: Metamedia Corporation, Fort Myers, Fla.

[21] Appl. No.: 69,581

[22] Filed: Jun. 1, 1993

[51] Int. Cl.⁶ .................................................. G06K 7/10
[52] U.S. Cl. ............................................ 235/462; 235/472
[58] Field of Search .................................... 235/462, 467, 235/472

[56] References Cited

U.S. PATENT DOCUMENTS 4,794,239  12/1988  Allais ........................................ 235/462
4,877,949  10/1989  Danielson et al. ...................... 235/462

*Primary Examiner*—Davis L. Willis
*Assistant Examiner*—Peter J. Rashid
*Attorney, Agent, or Firm*—K. P. Robinson

[57] ABSTRACT

Hand-held devices are provided for both scanning and decoding coded images such as two-dimensional bar codes. A linear scanning array of image sensing elements in the scanner/decoder provides image data with pixel-to-pixel synchronism, but lacking scan-to-scan synchronism as the scanning array is moved transversely across the bar code image. No tracking ball or roller is included to provide data enabling scan-to-scan synchronism. Redundant scan cancellation is employed to delete redundant image data from the stored image, with the adequate representation of coded information taking precedence over storage of a high resolution image. The stored image is sampled to correlate bar code edge pattern elements in order to identify the bounds and orientation of scanned bar code images. The redundancy-reduced stored bar code image is decoded within the hand-held unit, with use of data on bar code bounds and orientation, to provide decoded information for further use. Scanner/decoder devices and methods, and data redundancy reduction methods are described.

24 Claims, 4 Drawing Sheets

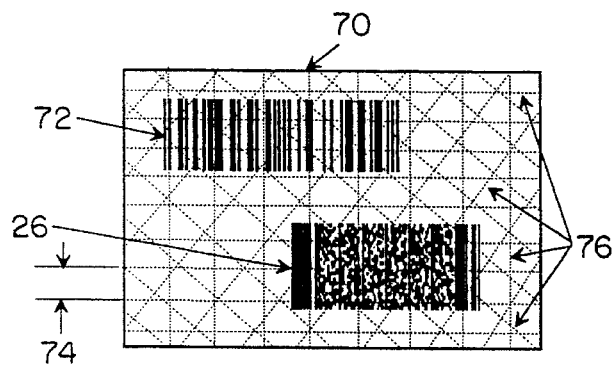
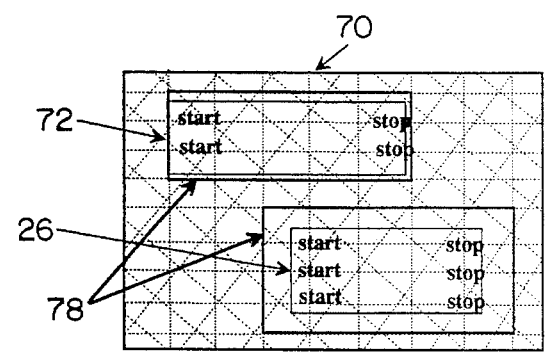
FIG. 6a  FIG. 6b
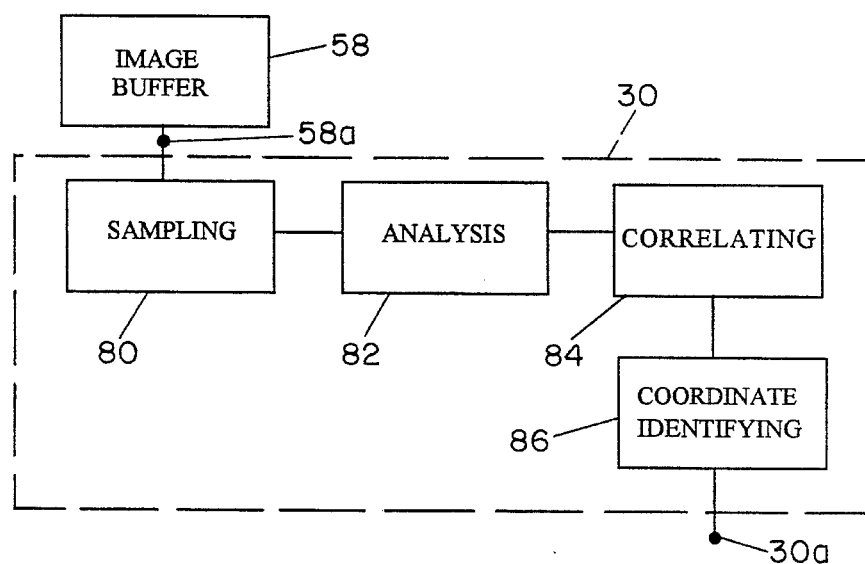
FIG. 7.

2-D BAR CODE SCANNER/DECODER HAVING A REDUNDANCY CANCELLER

This invention relates to the scanning and decoding of coded images. More particularly, the invention relates to economical hand-holdable devices capable of both scanning and decoding a two-dimensional bar code by use of a simplified scanner, redundant scan cancellation and a decoder operating without access to location tracking information.

BACKGROUND OF THE INVENTION

The application and use of the essentially ubiquitous one-dimensional bar code are well established. Such bar code symbols are provided as images having two physical dimensions, however the bar code includes information coded in only one dimension (e.g., left to right). While such one-dimensional bar codes have found innumerable applications, their usefulness is ultimately limited by amount of information which can be encoded in each such bar code.

Two-dimensional bar codes, enabling encoding of greatly increased quantities of information, have now been proposed. FIG. 1 shows an example of a two-dimensional bar code. Such bar codes typically include a few to many rows of coded data grouped in parallel alignment between start and stop patterns which bound the group of rows of coded data transversely to the rows. Coded row data, also typically included in the bar code, may provide information identifying and distinguishing individual rows of data, information regarding the data coded in such a row, information enabling error correction, etc. While such two-dimensional bar code images also have two dimensions, they differ from one-dimensional bar codes in providing two-dimensions of coded information. An example of a two-dimensional bar code is given in the present inventor's prior U.S. Pat. No. 5,113,455, entitled "System For Encoding Data in Machine Readable Graphic Form", issued May 12, 1992. Another example, described as the "PDF417" symbol, has been proposed in a PDF417 Specification, dated October 18, prepared by the present inventor for Symbol Technologies, Inc. and submitted for review by the Technical Symbology Committee of the Automatic Identification Manufacturers, Inc.

One-dimensional bar codes have come into wide usage on the basis of permitting application to supermarket items, vehicles, inventory parts, etc., of an image representing a multi-digit identifying number which is readily machine-readable. A variety of devices and applications of technology using lasers or charge coupled devices, for example, have been made available and are in wide use for reading such bar codes. On the one hand, two-dimensional bar codes make possible a wide-variety of new uses and applications in which a much wider range of information and data may be encoded and distributed by mail, facsimile transmission, etc., alone or in combination with other graphic or textural images, as well as being affixed to products, vehicles and inventory items, for example. On the other hand, two-dimensional bar codes require more complex capabilities for accurately reading the greatly increased amount of encoded data. Such requirements can be accommodated by use of sophisticated scanning equipment able to provide electronic output signals representing pixel data which is synchronized both on a pixel-by-pixel basis and also on a scan-by-scan basis. Availability of such signals enables reconstruction of a high-resolution image of the bar code, including accurate registration of the pixel elements of the image in two dimensions (e.g., horizontally and vertically). With use of such a high resolution scanner device or equipment, two-dimensionally synchronized image signals can be provided, so as to permit decoding of the bar code. Actual location and orientation of the bar code image within the scanned image (assuming the scanning device, as a practical matter, actually scans a somewhat larger image area which includes at least one bar code image) may entail a substantial data processing capability. In addition, the decoding of the bar code using the bulk of high-resolution image data resulting from use of such a high-resolution scanner may require additional data processing capabilities of a fairly extensive nature.

The result of the foregoing is that extension of use of two-dimensional bar codes to all logical applications may be restricted on an economic basis in the absence of comparatively simple devices capable of implementing the required scanning and decoding of the bar code images both reliably and economically.

It is therefore an object of this invention to provide hand-holdable devices capable of both scanning and decoding two-dimensional bar codes to provide a decoded output.

It is a further object to provide scanner/decoder devices which are reliable and economical in utilizing a single line of charge coupled devices or other image sensing elements, without reliance upon location tracking data, so that no tracking ball or roller device is included.

Further objects of the invention are to provide scanner/decoder devices enabling reliable operation with a scanning function providing image signals of limited image resolution and synchronization, and scanner/decoder devices operating with a reduction in image signal processing as a result of redundant scan cancellation.

Additional objects are to provide new and improved devices which accomplish both scanning and decoding of one-dimensional and two-dimensional bar codes and similar coded images, and particularly such devices which are compact, economical and readily hand operable.

SUMMARY OF THE INVENTION

In accordance with the invention, a hand-holdable bar code scanner/decoder, for decoding a two-dimensional bar code image including a plurality of rows of coded information with a start pattern and row coding, includes a linear array of image sensing means extending in a first direction. The linear array is used for providing image data representing a first scan across an image area (including the bar code image) transversely to such start pattern and for providing similar image data representing subsequent such scans as the linear array is moved with arbitrary speed and arbitrary direction transversely to the rows of coded information. Redundancy cancellation means, coupled to the linear array, for deleting redundant image data on a predetermined basis utilize comparison of the image data representing the first scan with the image data representing a subsequent scan, to provide selected image data representative of the bar code image. Locator means, coupled to the redundancy cancellation means, use the selected image data to develop identification of the bounds and orientation of the bar code image within the image area. Decoder means, operating without access to tracking data representative of either such arbitrary speed or such arbitrary direction, decode the bar code image with use of the start pattern and row coding as appropriate to derive decoded information and an output port is included for coupling the decoded information out of the scanner/decoder. As a result two-dimensional bar code information is decodable independently of availability of scan-to-scan synchronizing data.

Also in accordance with the invention, a method for using image data which is synchronized for only one dimension to decode a two-dimensional bar code image including a plurality of rows of coded information of finite row width and extending in a coding direction normal to row width, comprises the steps of:

(a) scanning an image area including a bar code image by placing a linear array of image sensing elements across the bar code image transversely to such row width to provide image data representing a first scan across the bar code image;

(b) moving the linear array with arbitrary speed and arbitrary direction transversely to the coding direction to provide image data representing subsequent scans across the bar code image;

(c) comparing step (a) image data representing the first scan with step (b) image data representing a subsequent scan on a predetermined basis;

(d) cancelling redundant image data by deletion of image data from one of the first and subsequent scans, if the image data is determined to be redundant on such predetermined basis of comparison, to develop selected image data representative of the bar code image; and (e) decoding the bar code image by use of such selected image data.

Further in accordance with the invention, a method for cancelling redundant image data resulting from scanning of a two-dimensional coded image including a plurality of rows of coded information, each row having a finite width dimension, comprises the steps of:

(a) providing image data representing a first scan across a coded image transversely to such width dimension;

(b) providing image data representing a plurality of subsequent such scans laterally spaced in such width dimension;

(c) comparing the image data representing the first scan to the image data representing a subsequent scan on a predetermined basis;

(d) cancelling redundant image data by deletion of image data from one of the first and subsequent scans if determined to be redundant when compared in step (c) on such predetermined basis;

(e) repeating steps (c) and (d) based upon comparison of image data representing other scans of the plurality of subsequent scans, to provide selected image data comprising such image data after deletion of redundant image data; and (f) making available from step (e) selected image data, representative of the coded content of the coded image, for further processing.

BRIEF DESCRIPTION OF THE DRAWINGS

FIGS. 6a and 6b are diagrams useful in describing operation of a bar code locator as included in the FIG. 3 scanner/decoder.

FIG. 7 provides a simplified block diagram of the FIG. 3 bar code locator.

DESCRIPTION OF THE INVENTION

Figures 2A, 2B:
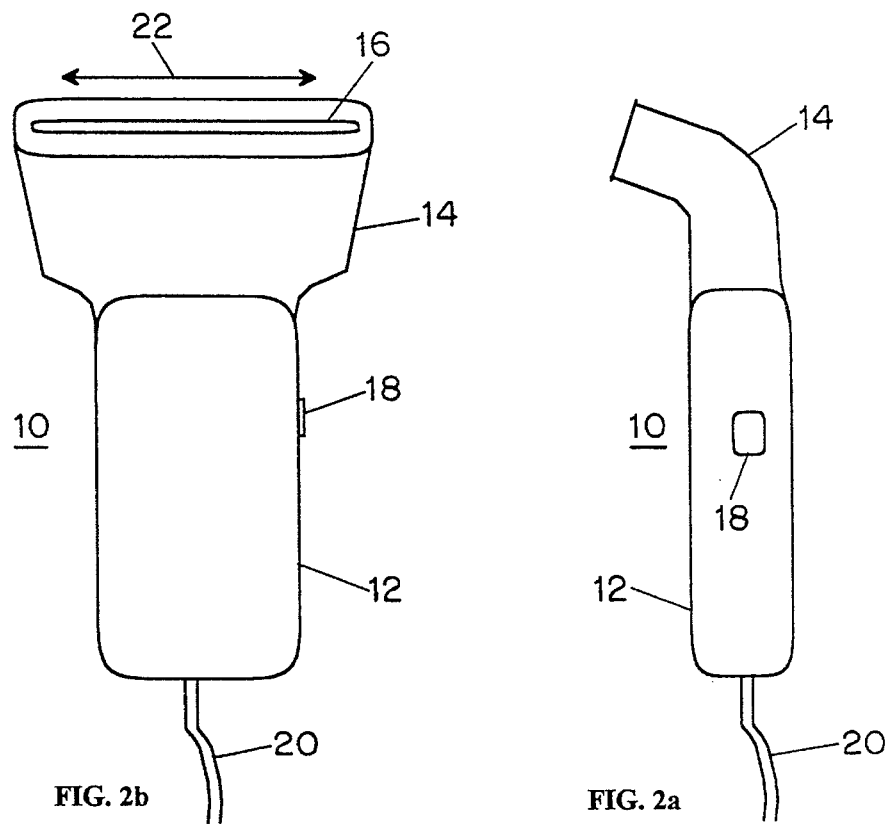
FIGS. 2a and 2b are side and bottom views of a scanner/decoder in accordance with the invention.

Referring now to FIGS. 2a and 2b there are shown simplified side and bottom views of a scanning and decoding device 10 (i.e., a "scanner/decoder") in accordance with the invention. As shown, scanner/decoder 10 includes a plastic shell having a handle section 12 and scanner and electronics housing section 14, which support an image sensing array 16, an activation button 18 and a signal output port cable 20 (which also includes provision for supplying electrical power to the unit).

Image sensing array 16 may comprise a linear array of image sensing devices, such as charge coupled devices (CCDs), arranged to provide image data in the form of electrical signals representative of the relative reflectance of light from an image. In the case of the two-dimensional bar code shown in FIG. 1, it will be appreciated that no grey scale values are necessitated, since only bipolar, or binary value, coding is utilized. The word "image" is used in the sense of a graphic, magnetic or other representation of information printed or fixed in some tangible form so as to enable the information to be perceived or recovered by use of a transducer. Accordingly, linear array 16 may comprise a plurality of CCDs spaced in a first direction shown at 22 in FIG. 2b, an array of sensors responsive to a magnetically encoded image, or other device or transducer arrangements appropriate for reading the encoded information along a scan line appearing under the device when placed across a coded image. In accordance with well-established techniques, an entire coded image is thus machine readable when the linear array 16 is moved across the image in a direction, such as direction 24 shown in FIG. 1, which is transverse to direction 22 in FIG. 2b (e.g., direction 24 is transverse if it is perpendicular to direction 22, or is at any other angle to direction 22 which causes direction 24 to intersect direction 22).

An important point to note is that, as shown in FIGS. 2a and 2b, the scanner/decoder in accordance with the invention does not require inclusion of any tracking ball, roller or other location or movement sensing device or transducer for providing data or signals representative of the speed, direction or distance of movement of the linear array 16 or the entire unit 10 relative to a coded image or bar code. With the absence of any tracking information, the device of FIGS. 2a and 2b can provide image data which is time synchronized on a pixel-by-pixel basis in direction 22, because the timing of the scanning or activation of the individual CCDs or other image sensing elements during any particular scan is carried out with a known timing sequence. However, since movement of the linear array 16 across the bar code in a transverse direction, such as 24, is implemented with hand movement with arbitrary speed and direction (including speeds and/or directions which may vary) the distance and parallelism between scans is unknown. The resulting image data is thus synchronized on a pixel-by-pixel basis, but unsynchronized on a scan-by-scan basis. While the device simplification thereby provided is advantageous, it is not believed that any practical manner of use of such unsynchronized image data in a hand-holdable decoder was available in the prior art.

Figure 3:
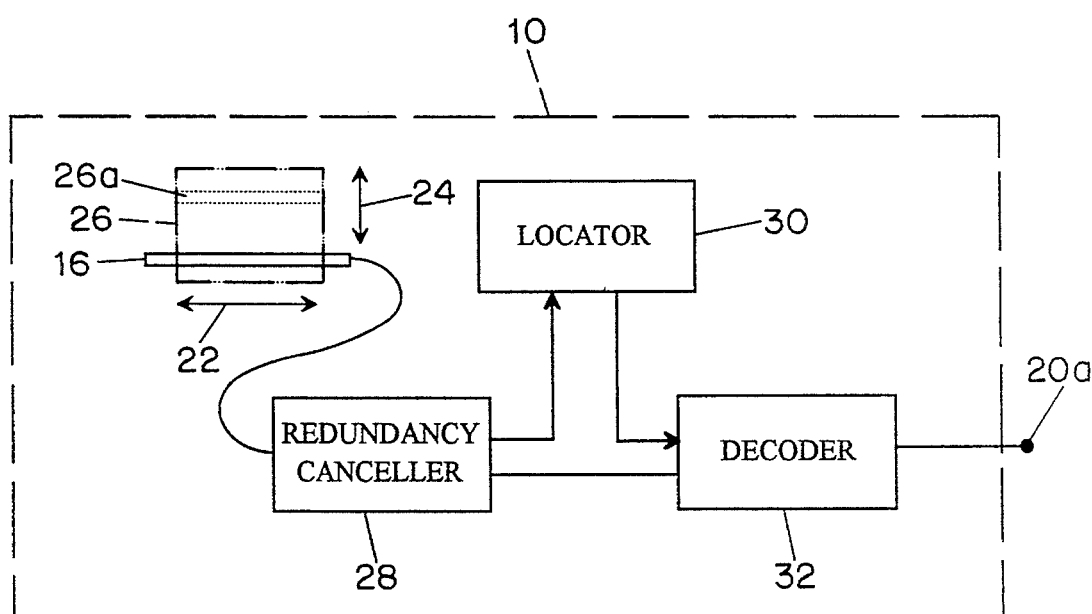
FIG. 3 is a block diagram of the scanner/decoder of FIGS. 2a and 2b.
Figure 4:
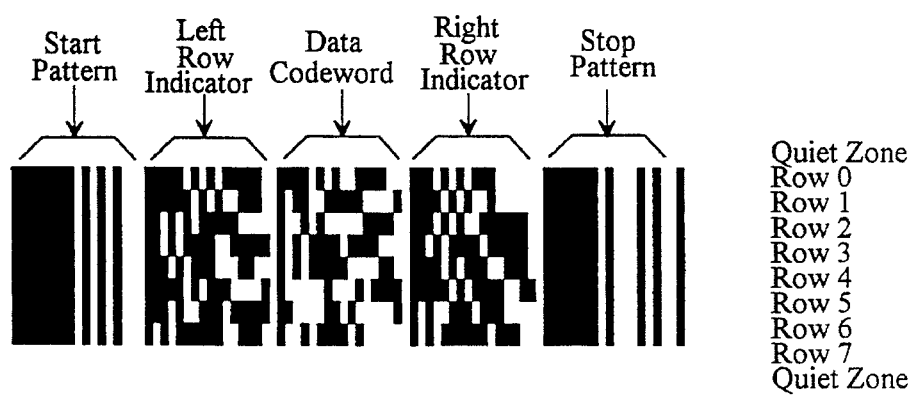
FIG. 4 is a simplified expanded view of a two-dimensional bar code with identification of included coding elements.

Referring now to FIG. 3, there is illustrated a block diagram of one embodiment of the scanner/decoder 10 of FIGS. 2a and 2b. Activation button 18 can be arranged in known manner to control the coupling of electrical power to the various components, so that its specific representation in FIG. 3 is unnecessary. The FIG. 3 arrangement will be described with particular reference to the FIG. 1 two-dimensional bar code which, as shown in simplified expanded form in FIG. 4, includes a plurality of rows (rows 1–5 in FIG. 4) of coded information (data codewords) preceded by a start pattern and followed by a stop pattern, which extend transversely to the rows of coded information. As shown in FIG. 4, this configuration of a two-dimensional bar code also includes row coding, indicated as left row and right row indicator codewords, which may incorporate data as to the identification of individual rows, number of included data codewords, error correction data and other pattern recognition information useful in accurately deriving decoded information from the bar code. It will be seen that each row of coded information has a finite width in the vertical direction in FIG. 4. Thus, while the bar code image includes information coded in two dimensions (e.g., vertically and horizontally) the coding remains constant or unchanging over the finite vertical width of each row of coded information. The FIG. 3 scanner/decoder will be described in greater detail with reference to the FIG. 4 bar code as a representative form of a two-dimensional coded image.

Figure 1:
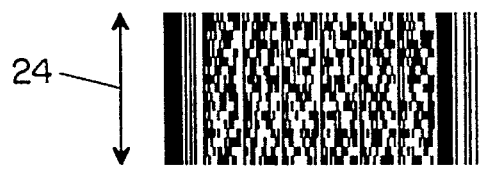
FIG. 1 shows a coded image in the form of a two-dimensional bar code.

In FIG. 3, the linear array 16 of image sensing elements is shown superimposed on a dotted representation 26 of the FIG. 1 bar code. While linear array 16 is represented in FIG. 3 in a manner visually supporting its movement transversely across bar code 26 as represented by arrow 24, it will be understood that the array 16 is actually supported in a fixed position on unit 10 as shown in FIG. 2b, in this embodiment. With this arrangement, linear array 16 extends in a first direction 22 across the bar code 26 and provides image data in the form of pixel data representing a first scan across an image area. As shown, the first scan is arranged to cross the bar code image transversely to the start and stop patterns identified in FIG. 4. It will be appreciated that the linear array 16 will typically extend beyond the edges of the bar code image, as shown, so that the image area scanned will actually be an area which is somewhat larger than the bar code image, but which includes the bar code image. In order to completely scan bar code image 26, the scanner/decoder 10 is then moved in a direction transverse to the rows of coded information (e.g., in direction 24). As the scanner/decoder, and thereby linear array 16, is moved by hand generally in the direction of arrow 24, but with arbitrary speed and arbitrary direction depending on the particular hand movement of the user, the bar code image is repeatedly scanned by repetitive sequential activation of the image sensing elements of the linear array 16. This sequential scanning is carried out with a repetitive timing fast enough so that the successive scans subsequent to the first scan will be closely spaced laterally for any reasonable speed of movement by the user. Thus, the bar code image will be scanned many times as the linear array 16 is moved across the bar code dimension in direction 24.

The FIG. 3 scanner/decoder further includes redundancy cancellation means, shown as redundancy canceller 28, for deleting redundant image data on a predetermined basis utilizing comparison of pixel data representing a first scan of the bar code image with pixel data representing a subsequent scan of the bar code image. As will be discussed in greater detail with reference to FIG. 5, redundancy canceller 28 performs a process including two primary steps. First, two scans are compared. Since the FIG. 4 bar code is encoded using image elements having only two values (i.e., binary value, without any intervening grey scale) each pixel as represented by the output of a side-by-side arrangement of a large number of CCDs in linear array 16, for example, can be represented by a value of one or zero. By comparing two scans on a pixel-by-pixel basis it is determined whether each pixel value in one scan corresponds identically to each respective pixel value in the other scan. In this way, correspondingly positioned pixels along each scan are compared. If such two scans are established as being identical in this way, the scans are redundant and only one of the two will be required to support the decoding process. Two points should be appreciated here. The bar code pattern appears to accurately delineate the desired coding, but is subject to printing and reproduction tolerances. Also, a CCD does not read an image value at an infinitesimal point, but provides an averaged value representing a small area of finite size, subject to reflectance and other effects. In other embodiments grey scales or other non binary value images may be used. For all of these reasons, pixel values as represented in an electrical signal will exist as approximations of the image values. As a result, the comparison process will incorporate predetermined comparison criteria which are inherent in the system, or are specifically selected and implemented, or both. With a binary value image scanned by transducers in the form of CCDs, each pixel value can be presented as a one or a zero and a straight-forward basis for comparison is to consider two scans having the same values in each corresponding pixel position as identical and, therefore, to treat one of such scans as redundant.

Referring to FIG. 3, if element 26a represents coded row 2 of the FIG. 4 bar code, it will be scanned a number of times as the user moves the scanner/decoder 10 across the bar code. The scan repetition frequency will normally be high enough so that each coded row will be scanned a plurality of times, even if the user moves the scanner/decoder rapidly. If the user moves the scanner slowly, or pauses, a given coded row may be scanned a very large number of times in succession. While, in FIG. 3, linear array 16 appears to be placed across the bar code in parallel relation to the coded rows (i.e., perpendicular to the start pattern), in actual use the scanning array 16 will have some angular displacement relative to the coded rows. Regardless of the angle, a level of scan redundancy can be expected and comparison criteria based on pixel value identity on a one hundred percent or lower percentage can be selected for determining the basis upon which scans are to be considered redundant. Once redundancy is established based upon comparison of two scans, the second step of the two step process referred to above with respect to operation of redundancy canceller 28, is to cancel or delete one of the two scans as unnecessary to accomplishment of the decoding process. By comparison of one scan with a subsequent scan and cancellation of redundant scans by methods such as described, redundancy cancellation means 28 provides selected image data for further processing and decoding in unit 10. In this selected image data (e.g., pixel data) information is synchronized in a first image dimension on a pixel-to-pixel basis. However, in accordance with the invention, the need for synchronization information (e.g., tracking information required in typical prior art arrangements) to permit data synchronization in the second image dimension has been overcome or avoided by the cancellation of redundant pixel data, as described.

The FIG. 3 scanner/decoder 10 also includes locator means, shown as locator 30, for using the selected image data from redundancy canceller 28 to develop identification of the bounds and orientation of a bar code image included within the scanned image area. It is impractical, in use of a hand controlled device, to assume either that the scanned image area will be exactly coexistensive with a selected bar code, or that the bar code will have a vertical/horizontal alignment within the scanned image. As a practical matter, the scanned image will be larger than the bar code image and the bar code image will be askew within the scanned image area. With reference to further processing and decoding of the bar code image, it is desirable to identify the bounds and orientation of the bar code within the area of the scanned image which is now represented by an electrical signal including a series of pixel values, for example. As will be described in greater detail with reference to FIGS. 6a and 6b, the bar code location bounds and angular orientation can be represented by coordinates of four corners of a nominally rectangular area encompassing the bar code. With reference to the FIG. 4 type of coded image, the start and stop patterns provide image elements of predetermined known characteristics which are useful in determining the actual location and orientation of a bar code. Locator 30, which is the subject of the present inventor's patent application Ser. No. 69,546, filed Jun. 1, 1993, now U.S. Pat. No. 5,304,787, issued Apr. 19, 1994, will be further described with reference to FIG. 7. As described, locator 30 is effective to provide identification of bar code bounds and orientation on the basis of corner coordinates or other data.

The FIG. 3 scanner/decoder 10 additionally includes decoder means, shown as decoder 32, for decoding a two-dimensional coded image, such as the FIG. 4 bar code. As illustrated, decoder 32 receives both selected image data from redundancy canceller 28 and bar code bounds and orientation identification data from locator 30. With these inputs, decoder 32 is enabled to use established decoding techniques which are particularly adapted to utilize and take advantage of the particular makeup of the specific form of coded image which is to be decoded. While scanner/decoder 10 can be used to decode one-dimensional bar codes, it will be appreciated that the FIG. 4 form of two-dimensional bar code incorporates extensive pattern interpretation aids or data. The FIG. 4 bar code includes distinctive vertical start and stop patterns, and left and right row indicator codewords. The row codewords include coding particularly adapted to identify specific rows and their composition, to enable the coded contents of one row to be distinguished and separated from adjacent rows, and to enable correction of decoding errors. Thus, by utilizing the content and coding techniques incorporated within a particular form of coded image, decoder 32 decodes the image and derives decoded information.

The scanner/decoder 10 of FIG. 3 includes an output port 20a, which may be a terminal or cable connector, or comprise cable 20 of FIGS. 2a and 2b, for coupling decoded information out of the scanner/decoder. Scanner/decoder 10 thus provides a different overall function than prior scanners whose output is typically a signal representative of coded image data, with decoding or other processing implemented in additional equipment external to such a prior scanner. Scanner/decoder 10 is effective to provide information signals which have already been decoded.

FIG. 5, REDUNDANCY CANCELLER

Figure 5:
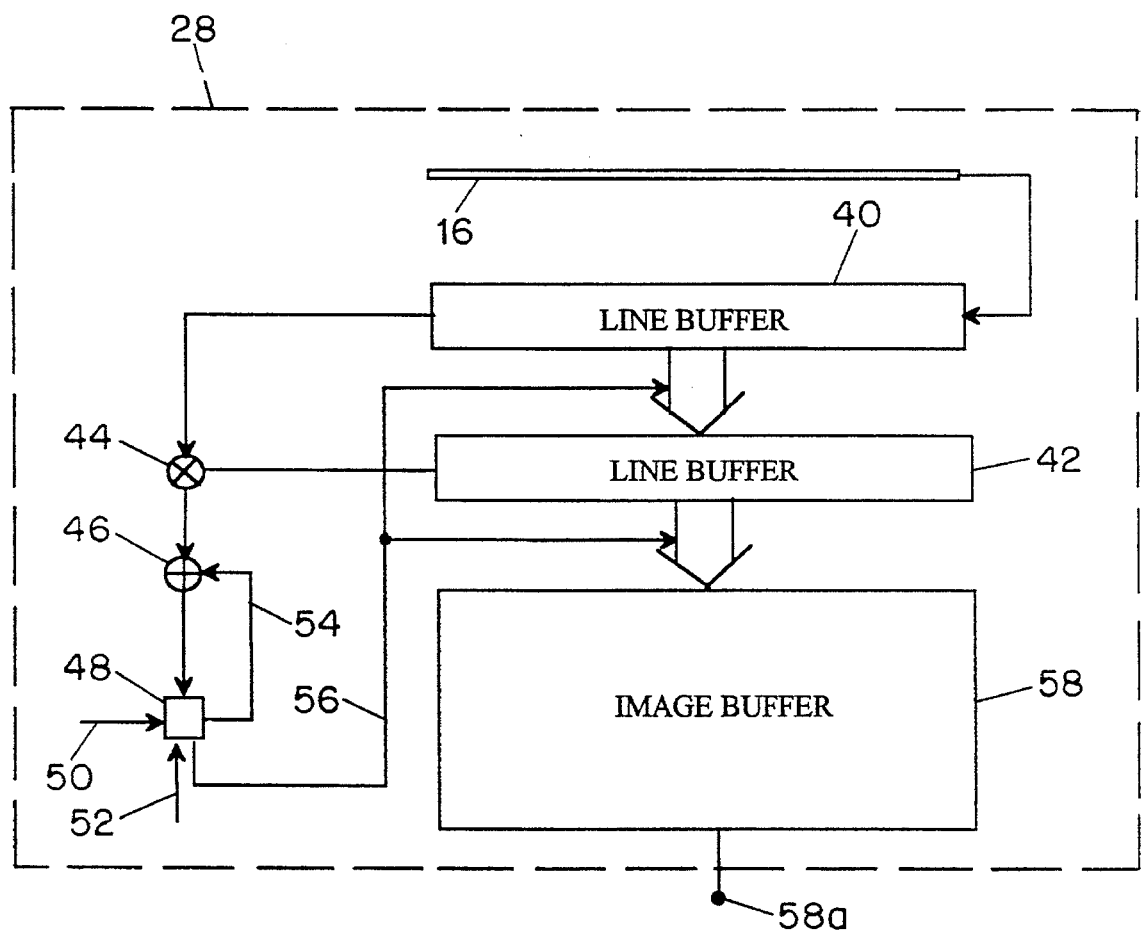
FIG. 5 is a representation of a form of redundancy canceller for use in the FIG. 3 scanner/decoder.

Referring now to FIG. 5, there is shown a representation of a redundancy canceller 28, suitable for use in scanner/decoder 10 of FIG. 3. In FIG. 5, linear array 16, typically comprising a one-dimensional CCD array, couples pixel data representing subsequent scans across a bar code or other image to current scan line buffer 40, which may be an n-bit fast shift register. During continuing operation, a current scan line of pixel data is thus stored in current scan line buffer 40 and a previous scan line of pixel data is stored in the similar previous scan line buffer 42. Correspondingly positioned pixels of such current and previous scan lines are compared on a pixel-by-pixel basis in exclusive OR circuit 44, which produces a unitary output ("1") if respective pixels from buffers 40 and 42 differ and a zero output ("0") so long as the respective pixel input values are the same. Outputs from exclusive OR circuit 44 are coupled to OR circuit 46 and to one bit register 48, which is responsive to scan line trigger signals supplied via input 50 and zero reset signals applied via input 52 at the end of each scan line. Such trigger and reset signals are derived from a counter (not shown) which is synchronized with the scan rate of CCD array 16. An output at 54 is applied from register 48 back to OR circuit 46. In operation, if comparison of previous and current scan lines in exclusive OR circuit 44 results in a unitary output to OR circuit 46, representing non-redundant scan lines, a trigger output at 56 is applied to cause the contents of scan line buffer 42 to be transferred for storage in image buffer 58 and the contents of current scan line buffer 40 to be transferred to buffer 42. In the absence of a trigger output at 56 (i.e., the compared scan lines are found to be redundant) the contents of scan line buffer 40 are not transferred, but are instead overwritten by pixel data for the next scan line. By repetition of this operation, scan lines of pixel data from linear array 16 are compared and either cancelled as redundant or passed on for storage in image buffer 58 if non-redundant. Image buffer 58 has a capacity for storage of many scan lines of pixel data comprising selected pixel data representing the scanned image containing a two-dimensional bar code, for example. The image stored in image buffer 58 is made available for further processing via access port 58a. A prior art scanner might necessitate storage of a high resolution image representation with full resolution in two image dimensions (i.e., 256 pixels×256 pixels, for example). In operation of redundancy canceller 28 by contrast, the number of scan lines of pixel data requiring storage may typically be reduced by cancellation of redundant scan line data, as described. In accordance with the invention, provision of a high resolution image per se, is not an objective; rather, the objective is to provide an image having resolution adequate to permit accurate decoding of the coded image, particularly a two-dimensional bar code. The FIG. 5 arrangement is illustrative and other arrangements may be provided by skilled persons in implementation of the invention.

FIGS. 6a, 6b and 7, LOCATOR

Referring now to FIGS. 6a and 6b there are shown two representations of a scanned image area which are useful in describing operation of locator 30 of FIG. 3. In FIG. 6a, 70 represents the outline border of an image area scanned by moving scanner/decoder 10 across a selected image area. In this example, image area 70 includes both a one-dimensional bar code image 72 and a two-dimensional bar code image 26. The image area 70 (with the two bar code images) exists in a suitable storage format, such as image buffer 58 of FIG. 5, which may represent what is commonly termed a frame buffer.

Locator 30 may comprise data processing means and programming suitable for implementing the following method for identification of the bounds and orientation of a bar code. With reference to FIG. 6a, stored image data representing the image area 70 is sampled along or between parallel scan lines (shown dotted) which are equally spaced, such spacing being termed the "skipfactor". The skipfactor for the horizontal scan lines in FIG. 6a is indicated at 74. Such sampling may desirably be carried out in four directions indicated at 76, which are equally spaced from each other at 45° angular separations. The resulting parallel samplings are then analyzed to identify bar code start and stop patterns by their distinctive predetermined coding as illustrated in FIG. 4. Identifications of start and stop patterns are then correlated or grouped, as being representative of a common bar code image, as follows:

(a) two start patterns (or two stop patterns) are grouped together if identified in parallel samplings separated by not more than a predetermined distance (e.g., twice the relevant skipfactor); and (b) a start pattern and a stop pattern are grouped together if they are both identified in the same parallel sampling with a separation between the patterns of not more than a predetermined separation (e.g., a maximum bar code image dimension).

Data as to such correlation is then analyzed to identify a nominally rectangular area bounding a bar code image included in image area 70. Thus, in FIG. 6b, bounding boxes for bar code images 72 and 26 are indicated at 78. The bounding boxes may suitably be identified by the coordinates of their respective corners, which will be effective to indicate both the bounds and the orientations of the respective bar code images 72 and 26. As a variation, bounding boxes such as at 78 may be determined based upon analysis of the positioning of all of the start and stop pattern positions correlated or grouped as above as belonging to a single bar code, in order to determine the smallest rectangular outline or bounding box capable of encompassing all of the correlated start and stop patterns for that particular bar code. Again, such bounding box may be identified by its corner coordinates. The resulting data representative of the bounds and orientation of a bar code is then made available as an output from locator 30 for use in decoder 32 in FIG. 3 for decoding the selected image data provided by redundancy canceller 28.

FIG. 7 provides a simplified block diagram of locator unit 30 of FIG. 3. As shown, locator 30 includes sampling means 80 coupled to access port 58a of image buffer 58 (see FIG. 5). Sampling means 80 is arranged to implement the above-described sampling of the image stored in image buffer 58 along equally spaced parallel lines in a four equally-spaced directions as indicated at 76, in order to provide parallel samplings of bar code 26. Analysis means 82 utilizes the parallel samplings provided by sampling means 80 to identify the presence in such parallel samplings of start patterns and stop patterns. Correlating means 84 in FIG. 7 provides correlating data identifying start and stop patterns which are representative of a common bar code image. Such correlation to a common bar code image is provided, as described above, by grouping two start patterns (or two stop patterns) which are identified in successive parallel samplings of the stored bar code image and also grouping start and stop patterns which are identified in the same sampling with such patterns having not more than a predetermined separation (e.g., maximum bar code width). Coordinate identifying means 86 uses the correlating data from correlating means 84, which correlates start and stop patterns representative of the same or common bar code, to develop identification of the bounds and orientation of the bar code image. Such identification is then made available at output port 30a as coordinates of the four corners of a nominally rectangular box bounding the bar code image or in other form as desired. Locator 30 may comprise data processing equipment and associated programming to carry out the functions of sampling means 80, analysis means 82, correlating means 84 and coordinate identifying means 86 using known forms of data processing and each such means need not necessarily be implemented in individually discrete form within locator 30. The identification of the bounds and orientation of the bar code image is provided at output port 30a of locator 30 for use in enabling the further processing of the selected image data in order to decode the bar code image. In addition to identifying the bounds and orientation of a bar code image included in a scanned image area, locator 30 may be employed to provide an indication of whether the presence of any predetermined type of bar code has been identified within the scanned image area.

FIG. 8 FLOW DIAGRAM

Figure 8:
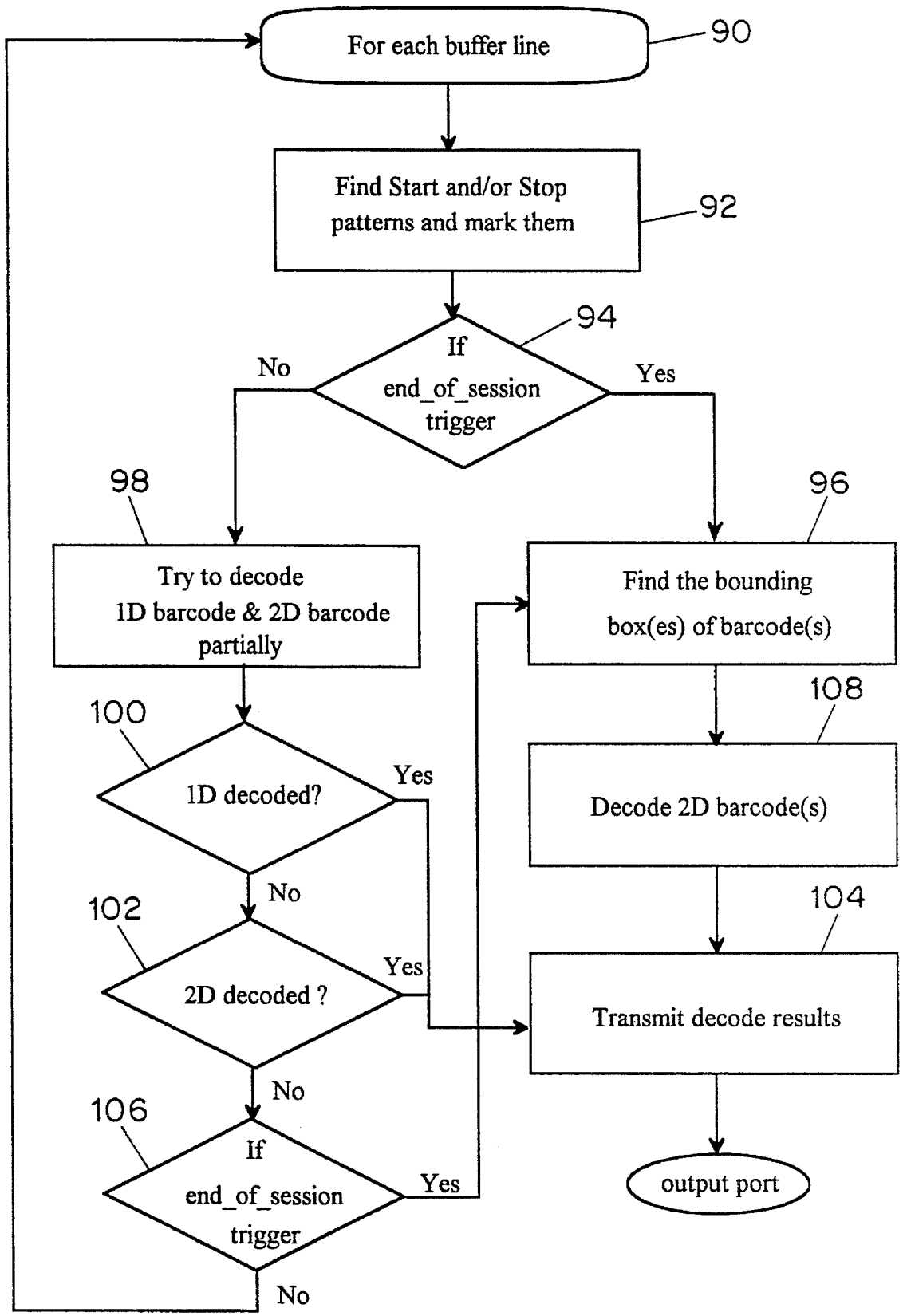
FIG. 8 is a flow diagram useful in describing certain aspects of operation of the FIG. 3 scanner/decoder.

Referring now to FIG. 8, there is shown a flow diagram illustrating an algorithm employed in operation of the FIG. 3 scanner/decoder. As indicated at 90, each time a scan line of image data is added to the image buffer 58 processing is implemented. At step 92, locator 30 operates to identify start and stop patterns. Step 94 is responsive to the presence or absence of an end-session trigger indicative of whether the movement of scanner/decoder 10 across a desired image area has been completed. If a session trigger is received, locator 30 proceeds at 96 with identification of bar code bounding box coordinates. If no session trigger is received, decoder 32 attempts at 98 to provide one-dimensional bar code decoding or partial two-dimensional bar code decoding. If either of such decodings is successful at 100 or 102, the decoded results are made available at 104. If neither of such decodings is successful, then at 106 in the absence of an end-session trigger the preceding steps are repeated. If an end-session trigger is present at 106, two-dimensional bar code decoding is implemented at 108 and decoded results are made available at 104 for further processing and utilization.

While there has been described the currently preferred embodiment of the invention, those skilled in the art will recognize that other and further modifications may be made without departing from the invention and it is intended to claim all modifications and variations as fall within the scope of the invention.

What is claimed is:

1. A hand-holdable bar code scanner/decoder, for decoding a two-dimensional bar code image including a plurality of rows of coded information with a start pattern and row coding, comprising:

a linear array of image sensing means extending in a first direction for providing undecoded image data representing a first scan across an image area, including said bar code image, transversely to said start pattern and for providing similar undecoded image data representing subsequent such scans as said linear array is moved with arbitrary speed and arbitrary direction transversely to said rows of coded information;

a redundancy canceller, coupled to said linear array, for deleting redundant undecoded image data on a basis utilizing comparison of said image data representing said first scan with said image data representing a subsequent scan, to provide redundancy reduced image data representative of said bar code image;

a storage device, coupled to said redundancy canceller, for storing redundancy reduced image data;

decoder means, coupled to said storage device and operating without access to tracking data representative of either said arbitrary speed or of said arbitrary direction, for decoding said two-dimensional bar code image by use of said redundancy reduced image data, and said start pattern and row coding as appropriate, to derive decoded information; and an output port, coupled to said decoder means, for coupling said decoded information out of said scanner/decoder.

2. A bar code scanner/decoder as in claim 1, wherein said linear array is a plurality of charge-coupled devices spaced in said first direction.

3. A bar code scanner/decoder as in claim 1, wherein said redundancy canceller includes a scan buffer able to store said image data in the form of pixel data representing said first scan for comparison with similar pixel data representing said subsequent scan, and said predetermined basis comprises deleting pixel data representing an entire scan when all correspondingly positioned pixels in said first and subsequent scans have the same values based upon said comparison.

4. A bar code scanner/decoder as in claim 1, wherein said first scan and said subsequent scan are successive scans.

5. A bar code scanner/decoder as in claim 1, wherein said two-dimensional bar code also includes a stop pattern and said decoder means uses both said start pattern and said stop pattern as appropriate to derive said decoded information.

6. A bar code scanner/decoder as in claim 1, wherein said image data representing subsequent scans is provided as said linear array is moved transversely to said rows of coded information with one or more of varying arbitrary speed and varying arbitrary directions.

7. A bar code scanner/decoder as in claim 1, additionally comprising:

image buffer means, in the form of said storage device, for storing said redundancy reduced image data to provide a stored image representative of said bar code image;

locator means, coupled to said image buffer means, for using said stored image to develop identification of the bounds and orientation of said bar code image within said image area;

and wherein said decoder means additionally uses said identification of the bounds and orientation of said bar code image in deriving said decoded information from said stored image.

8. A bar code scanner/decoder as in claim 1, wherein said bar code also includes a stop pattern and said scanner/decoder additionally comprises:

image buffer means, in the form of said storage device, for storing said redundancy reduced image data to provide a stored image representative of said bar code image;

sampling means, coupled to said image buffer means, for sampling said stored image along equally spaced parallel lines in a plurality of directions across said bar code image to provide parallel samplings;

correlating means, coupled to said sampling means, for using said parallel samplings to provide correlating data identifying start and stop patterns as representative of a common bar code image when two start patterns, or two stop patterns, are present in successive parallel samplings extending in the same direction and also when start and stop patterns are present in the same parallel sampling with not more than a predetermined separation between said start and stop patterns; and coordinate identifying means, coupled to said correlating means, for using said correlating data identifying start and stop patterns representative of a common bar code to develop identification of the bounds of said bar code image within said image area;

and wherein said decoder means additionally uses said identification of said bounds of said bar code image in decoding said coded information from said stored image.

9. A scanner/decoder, for decoding a coded image including a plurality of parallel rows of coded information of finite row width and extending in a coding direction normal to said row width, comprising:

a linear array of image sensing means extending in a first direction for providing undecoded image data representing a first scan across an image area, including said coded image, transverse to said row width and for providing similar undecoded image data representing subsequent such scans as said image sensing means is moved with arbitrary speed and arbitrary direction transversely to said coding direction;

a redundancy canceller, coupled to said image sensing means, for deleting redundant undecoded image data on a basis utilizing comparison of said image data representing said first scan and said image data representing a subsequent scan, to provide redundancy reduced image data representative of said coded image;

an image storage device, coupled to said redundancy canceller, for storing said redundancy reduced image data to provide a stored image representative of said bar code image;

decoder means, coupled to said image storage device and operating without access to tracking data representative of said arbitrary speed or arbitrary direction, for decoding said coded image to derive decoded information; and an output port, coupled to said decoder means, for coupling said decoded information out of said scanner/decoder.

10. A scanner/decoder as in claim 9, additionally comprising:

locator means, coupled to said image storage device, for using said stored image to develop identification of the bounds of said coded image within said image area;

and wherein said decoder means uses said identification of the bounds of said coded image in deriving said decoded information.

11. A scanner/decoder as in claim 9, wherein said redundancy canceller means deletes image data representing an entire scan when redundancy between said first and subsequent scans is indicated based upon said comparison on said basis.

12. A method, for using image data which is synchronized for only one dimension to decode a two-dimensional bar code image including a plurality of rows of coded information of finite row width and extending in a coding direction normal to said row width, comprising the steps of:

(a) scanning an image area including said bar code image by placing a linear array of image sensing elements across said bar code image transversely to said row width to provide undecoded image data representing a first scan across said bar code image;

(b) moving said linear array with arbitrary speed and arbitrary direction transversely to said coding direction to provide undecoded image data representing subsequent scans across said bar code image;

(c) comparing said step (a) image data representing said first scan with said step (b) image data representing a subsequent scan;

(d) cancelling redundant undecoded image data by deletion of image data from one of said first and subsequent scans, if said image data is determined to be redundant, to develop redundancy reduced undecoded image data representative of said bar code image;

(e) storing said redundancy reduced undecoded image data representative of said bar code image;

(f) decoding said bar code image by use of said stored redundancy reduced undecoded image data.

13. A method as in claim 12, including between steps (d) and (e) the additional step of:

(x) analyzing said step (d) redundancy reduced image data to provide identification of the bounds and orientation of said bar code image;

and wherein said identification of said bounds and orientation is utilized in said step (f) decoding.

14. A method as in claim 13, wherein said two-dimensional bar code also includes start and stop patterns extending in the direction of said row width and each row of coded information includes row coding data, and wherein said start and stop patterns are utilized in step (x) in identification of said bounds and orientation of said bar code image and said row coding data is utilized in step (f) in decoding said bar code image.

15. A method as in claim 12, wherein said image data is image pixel data and wherein in step (c) said image data is compared on a pixel-by-pixel basis to determine equality of pixel values and in step (d) all image data is deleted from one of said first and subsequent scans as redundant if all correspondingly positioned pixels in said two scans have equal values when compared on said basis.

16. A method for cancelling redundant image data resulting from scanning of a two-dimensional coded image including a plurality of rows of coded information, each row having a finite width dimension, comprising the steps of:

(a) providing undecoded image data representing a first scan across said coded image transversely to said width dimension;

(b) providing undecoded image data representing a plurality of subsequent such scans laterally spaced in said width dimension;

(c) comparing said image data representing said first scan to said image data representing a subsequent scan;

(d) cancelling redundant undecoded image data by deletion of image data from one of said first and subsequent scans if determined to be redundant when compared in step (c);

(e) repeating steps (c) and (d) based upon comparison of image data representing other scans of said plurality of subsequent scans, to provide selected undecoded image data comprising said image data after deletion of redundant image data; and (f) making available from step (e) selected undecoded data, representative of the coded content of said coded image, for further processing.

17. A method as in claim 16, wherein step (c) said includes comparison of each pixel of the image data of two scans on a pixel-by-pixel basis, and wherein redundant image data is cancelled in step (c) by deletion of image data comprising one full scan if the image data of two scans have corresponding values on a pixel-by-pixel basis.

18. A method as in claim 17, wherein image data provided for comparison in step (c) is represented by pixel data having one of only two values representative of black or white bar code image portions.

19. A method as in claim 16, wherein step (c) is implemented by comparing image data of two successive scans.

20. A method as in claim 16, wherein said image data provided in step (a) represents scans across a coded image which is a two-dimensional bar code.

21. A hand-holdable bar code scanner/decoder, for decoding a two-dimensional bar code image including a plurality of rows of coded information with a start pattern and row coding, comprising:

a linear array of image sensing means extending in a first direction for providing undecoded image data representing a first scan across an image area, including said bar code image, transversely to said start pattern and for providing similar undecoded image data representing subsequent such scans as said linear array is moved with arbitrary speed and arbitrary direction transversely to said rows of coded information;

a redundancy canceller, coupled to said linear array and arranged to provide redundancy reduced undecoded image data representative of said bar code image and to cancel image data that is redundant to said redundancy reduced undecoded image data;

a storage device, coupled to said redundancy canceller, for storing redundancy reduced image data;

decoder means, coupled to said storage device and operating without access to tracking data representative of either said arbitrary speed or of said arbitrary direction, for decoding said bar code image; and an output port, coupled to said decoder means, for coupling said decoded information out of said scanner/decoder.

22. A bar code scanner/decoder as in claim 21, wherein said redundancy canceller provides redundancy reduced undecoded image data which may include scans representative of one or more partial rows of coded information as a result of said movement of the linear array with said arbitrary direction, and wherein image data is not decoded prior to coupling of redundancy reduced undecoded image data to said decoder means.

23. A bar code scanner/decoder as in claim 21, wherein said first scan and said subsequent scan are successive scans.

24. A bar code scanner/decoder as in claim 21, additionally comprising an image storage device, coupled to said redundancy canceller, for storing said redundancy reduced undecoded image data to provide a stored image representative of said bar code image for decoding by said decoder means.

* * * * *